United States Patent [19]

Yanik et al.

[11] 4,111,796

[45] Sep. 5, 1978

[54] METHOD FOR PRESULFIDING HYDRODESULFURIZATION CATALYSTS

[75] Inventors: Stephen J. Yanik, Valencia; Angelo A. Montagna, Monroeville; James A. Frayer, Pittsburgh, all of Pa.

[73] Assignee: Gulf Research & Development Co., Pittsburgh, Pa.

[21] Appl. No.: 673,075

[22] Filed: Apr. 2, 1976

[51] Int. Cl.$^2$ .................. C10G 23/02; B01J 27/02
[52] U.S. Cl. ......................... 208/216; 252/439
[58] Field of Search ................. 252/439; 208/216

[56] References Cited

U.S. PATENT DOCUMENTS

| | | | |
|---|---|---|---|
| 2,620,362 | 12/1952 | Stiles | 252/439 X |
| 3,248,318 | 4/1966 | White | 252/439 X |
| 3,274,122 | 9/1966 | Holmes et al. | 252/439 |
| 3,477,963 | 11/1969 | van Venrooy | 252/439 |
| 3,481,862 | 12/1969 | Davis et al. | 252/439 |
| 3,840,474 | 10/1974 | Bercik et al. | 252/439 |
| 3,859,204 | 1/1975 | Brunn et al. | 208/216 |
| 3,915,894 | 10/1975 | Clements et al. | 252/439 |
| 3,933,683 | 1/1976 | Hilfman | 252/439 |

*Primary Examiner*—Delbert E. Gantz
*Assistant Examiner*—William G. Wright

[57] ABSTRACT

An improved method for presulfiding a hydrodesulfurization catalyst which comprises continuously contacting the catalyst with a sulfiding treating agent at a relatively low temperature and pressure and only until the total amount of sulfur in the treating agent contacting the catalyst is no more than 55 percent of the amount of sulfur required to sulfide the supported metals on the catalyst to their completely sulfided forms.

6 Claims, 2 Drawing Figures

METHOD FOR PRESULFIDING HYDRODESULFURIZATION CATALYSTS

BACKGROUND OF THE INVENTION

The hydrodesulfurization of hydrocarbon stocks with catalysts comprising supported hydrogenating components selected from the Group VI-B and Group VIII metals in a form capable of promoting hydrogenation reactions is conventional in the art. Especially effective catalysts for the purpose of such hydrodesulfurization reactions are those comprising molybdenum and two members of the iron group metals. Preferred catalysts of this class are those containing nickel, cobalt and molybdenum but other effective combinations of iron group metals and molybdenum comprise iron-molybdenum-cobalt, nickel-molybdenum-iron, as well as combinations of nickel and molybdenum, cobalt and molybdenum, nickel and tungsten. The hydrogenating or desulfurizing components of such catalysts are employed in the sulfided form.

Although the hydrogenating components indicated above may be employed in any proportions with each other, especially effective catalysts are those in which the hydrogenating components consist of (a) a combination of 2 to 25%, preferably 4 to 16% by weight molybdenum and at least two iron group metals where the iron group metals are present in such proportions that the atomic ratio of each iron group metal with respect to molybdenum is less than about 0.6 and (b) a combination of about 5 to 40%, preferably 10 to 25% of nickel and tungsten where the atomic ratio of tungsten to nickel is about 1:0.1 to 5, preferably 1:0.3 to 4.

In the preparation of the hydrodesulfurization catalysts, the hydrogenating components are composited with a porous refractory oxide support, preferably alumina. Molybdenum, for example, can be deposited on the support from an aqueous solution of salts such as ammonium molybdate, ammonium paramolybdate, molybdenum pentachloride, or molybdenum oxalate. After drying, the impregnated support can be calcined to convert the molybdenum into the oxide form. The molybdenum containing carrier, which is normally shaped in the form of extrudates, granules, pellets or balls, can then be treated with an aqueous solution of the Group VIII metal salt followed by calcining. If a second Group VIII metal is employed, it can be deposited in a like manner. Nitrates or acetates of the Group VIII metals are normally utilized although any water soluble salt which leaves no harmful residue can be employed. If desired, the Group VIII metals and molybdenum can be deposited simultaneously, but are preferably deposited in sequence with intervening oven drying which is normally conducted at a temperature in the range of 220° to 350° F. (104° to 177° C.) for a period of 1 to 24 hours.

In addition to the hydrogenating components of Group VI-B and Group VIII, the desulfurization catalyst can also contain a Group IV-B metal as a promoter. Under such circumstances, the Group IV-B metal, preferably titanium or zirconium, is present in the catalyst in an amount in the range of 1.0 to 10.0 weight percent based upon the total weight of the catalyst. The Group IV-B metal can be added to the catalyst composite by the technique of impregnating the calcined support with an aqueous solution of the metal salt, such as titanium tetrachloride. The Group IV-B metal can be deposited on the support following impregnation of the support with the Group VI and Group VIII metals or simultaneously with the deposition of the Group VI and/or Group VIII metals.

The carrier or support employed in the preparation of the hydrodesulfurization catalyst can be any refractory oxide having a surface area in excess of 3 square meters per gram such as pure alumina, a silica stabilized alumina containing up to about 5 percent by weight based upon the carrier of silica, silica gels, acid leached borosilicate glass and spinels, e.g. magnesium aluminate. Preferably, however, the carrier is an aluminum which is silica-free.

Conventionally hydrodesulfurization catalysts as described above can be presulfided after calcination, or after calcination and reduction by contacting the catalyst with a hydrogen sulfide and hydrogen gaseous mixture at a temperature in the range of 500° to 700° F. (261° to 372° C.) and at an elevated pressure. Gaseous mixtures containing low or high concentrations of hydrogen sulfide have been used, with gaseous mixtures containing low concentrations of hydrogen sulfide being preferably employed for economic reasons. Conventional presulfiding methods employing hydrogen sulfide or other sulfiding agents are directed to adding to the catalyst composite at least the stoichiometric amount of sulfur required to completely sulfide the hydrogenation metals of the catalyst composite.

To insure completeness of the sulfiding reaction, the presulfiding process is normally conducted until the concentration of the sulfur contained in the total effluent withdrawn from the presulfiding zone is substantially equivalent to the concentration of the sulfur in the feed to the presulfiding zone. Normally, the presulfiding step is conducted for a period of time of from 16 to 24 hours to insure complete conversion of the hydrogenation metals to the most stable sulfide forms.

SUMMARY OF THE INVENTION

By the invention an improved hydrodesulfurization catalyst presulfiding method is provided whereby the catalyst is contacted with a selected treating agent at a temperature in the range of 200° to 450° F. (93° to 232° C.) and at a pressure in the range of atmospheric to 400 psig (1.05 to 28 kg/cm$^2$), the contacting being conducted until the total amount of sulfur in the treating agent brought into contact with the catalyst is in the range from 10 to 55 percent of the amount of sulfur required to completely sulfide the metals on the catalyst.

DESCRIPTION OF THE INVENTION

Figure 1:
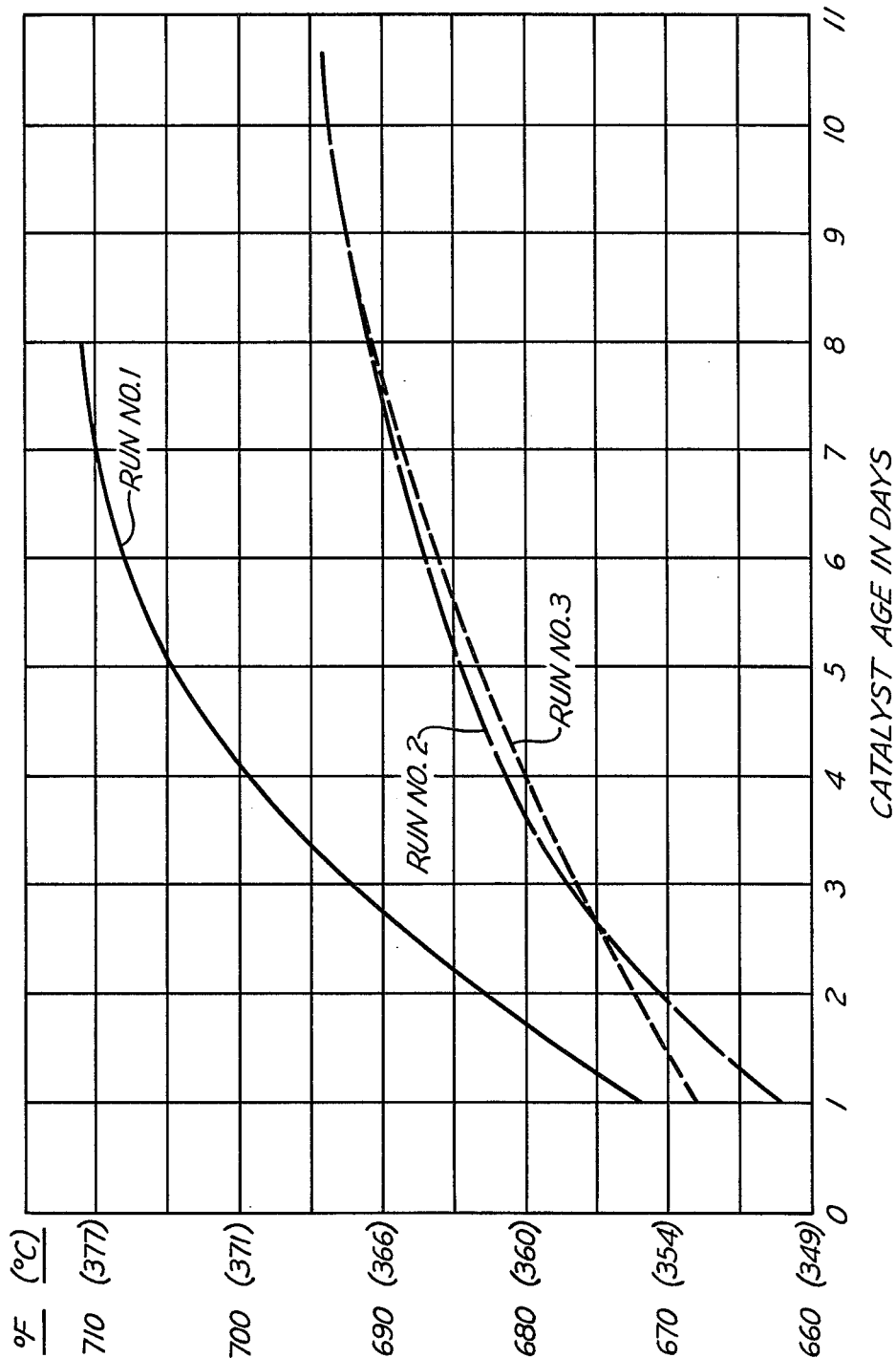
FIGS. 1 and 2 illustrate specific embodiments of catalyst presulfided by the inventive process.

The invention is directed to the presulfiding of the previously described hydrodesulfurization catalysts. The catalysts containing Group VI and Group VIII hydrogenating components are contacted with a hereafter described sulfiding treating agent at a temperature in the range of 200° to 450° F. (93° to 232° C.) and at a pressure in the range of atmospheric to 400 psig (1.05 to 28 kg/cm$^2$).

The contact between the catalyst and the sulfiding treating agent can be conducted with the treating agent in the vapor or liquid phase. Suitable sulfiding treating agents include $C_1$-$C_{20}$ mercaptans, dimethyl sulfide, carbon disulfide and other organic sulfides containing from 1 to 20 carbon atoms.

The contacting between the sulfiding treating agent and the catalyst is conducted in an oxygen-free atmosphere and preferably in an atmosphere which is substantially hydrogen free. However, the novel presulfiding method is also effective when conducted in a hydrogen atmosphere, if the flow rate allows no more than 2400 SCF (42.7200 SCM/100L) of hydrogen per barrel of catalyst per hour to be circulated.

The contact between the sulfiding agent and the catalyst can be effected by employing a petroleum oil stock as a carrier for the sulfiding agent. The petroleum oil stock should be one which is primarily in the liquid phase at the presulfiding conditions. Suitable carriers include gas oil, furnace oil, cycle oil and petroleum distillates. In those instances where vapor phase presulfiding is to be employed, a hydrocarbon which is a vapor under the presulfiding conditions, such as hexane, can be employed as the carrier.

Although not to be limited thereto, the concentration of sulfiding agent sulfur in the liquid carrier will normally range from 2,000 to 12,000 parts per million (ppm) based on the liquid carrier throughout. In vapor phase treating, the concentration of treating agent sulfur will normally be in the range of 0.5 – 4.0 weight percent based on total vapor throughput.

Presulfiding of the catalyst is conducted until the total amount of sulfur in the treating agent brought into contact with the catalyst is in the range from 10 to 55 percent of the amount of sulfur required to sulfide the metals on the catalyst to their completely sulfided forms. When employing a treating agent and carrier as described above, contact between the catalyst and sulfiding agent can be conducted at a sulfur weight hourly space velocity (weight of sulfur in the sulfiding agent per weight of catalyst per hour) of less than 0.12 and under such conditions that the time for conducting the presulfiding process will be in the range of from 4 to 12 hours.

As previously described, the presulfiding process is conducted at a pressure in the range from atmospheric to 400 psig (1.05 to 28 kg/cm$^2$) with the process conducted in a substantially oxygen-free atmosphere. When pressures above atmospheric are to be employed, an inert non-reducing gas such as nitrogen can be utilized.

The presulfided catalyst can be employed in the hydrodesulfurization of sulfur-containing hydrocarbon stocks. Generally, the operating conditions employed in the hydrodesulfurization process comprises a temperature in the range from about 500° to about 1000° F. (260° to about 538° C.), preferably in the range from about 600° to about 800° F. (316° to about 427° C.) and more preferably in the range from about 650° to about 780° F. (343° to 416° C.). The space velocity can be in the range from about 0.10 to about 10.0 volumes of charge stock per volume of catalyst per hour. The hydrogen feed rate employed normally ranges from about 500 to about 10,000 standard cubic feet per barrel of feed stock (8.9 to about 178 SCM/100L). The pressure employed in the process can be in the range from about 100 to about 5,000 psig (7 to about 350 kg/cm$^2$).

The feed stocks which can be hydrodesulfurized employing the pre-sulfided catalysts of this invention include all naphtha and heavier hydrocarbons. The feed stocks particularly suitable are those containing a substantial quantity of components, i.e. greater than 50 percent by volume, boiling above about 400° F. (204° C.) and preferably above about 500° F. (260° C.). Such materials can be synthetic crude oils such as those derived from shale oil, tar sands and coal or full petroleum crudes or any individual fraction thereof. Thus, for example, the feed stock to the hydrodesulfurization process can be an atmospheric topped crude or it can be a vacuum residual fraction boiling substantially above 950° F. (510° C.). However, it can also be a naphtha or any of the intermediate distillate fractions, such as, a furnace oil boiling above about 450° to about 650° F. (232° to about 343° C.) or a gas oil boiling from above about 650° to 950° F. (343° to 510° C.).

In a discussion of specific embodiments of the novel presulfiding process reference is made to the drawing. FIG. 1 compares the results of three pilot plant aging studies. During each of the aging runs, the catalyst, the Kuwait reduced crude feed stock boiling substantially above 650° F. (343° C.) and containing 1.0 weight percent sulfur, the desulfurization level, and all operating conditions, except reactor temperature, were identical. Reactor Temperature was adjusted to meet a predetermined degree of desulfurization. The basic difference in the runs was the presulfiding procedure used for each catalyst. Prior to Run 1, illustrative of the prior art, the catalyst employed therein was presulfided for 12 hours by treating a West Texas vacuum gas oil containing 2.0 weight percent sulfur at 650° F. (343° C.), 2,143 lbs/in$^2$ (150 kg/cm$^2$) pressure, and 1.0 liquid hourly space velocity (LHSV) while charging 2,000 standard cubic feet per barrel of feed (356 m$^3$/m$^3$) of gas containing 95 volume percent hydrogen and 5 percent methane. The catalyst employed comprised 0.5 weight percent nickel, 1.0 weight percent cobalt and 8.0 weight percent molybdenum on alumina. The amount of sulfur removed from the charge stock during presulfiding was equivalent to 27 percent of the weight of the catalyst. If all of the metals were converted to NiS$_2$, and CoS$_2$, and MoS$_3$, the required amount of sulfur would be 9.7 weight percent of the catalyst. If all of the metals were converted to their "subsulfide" forms (i.e. Ni$_3$S$_2$, Co$_9$S$_8$ and MoS$_2$), the required amount of sulfur would be 6.0 weight percent of the catalyst. Thus, it can be seen that a large excess of reactive sulfur was passed over the catalyst bed during the presulfiding performed prior to Run 1.

In Run 2, the catalyst was presulfided for 12 hours by treating the same West Texas gas oil used for the Run 1 presulfiding. The presulfiding conditions were: 401° F. (205° C.), 215.7 lbs/in$^2$ (15.1 kg/cm$^2$) pressure, and 1.0 LHSV while charging 300 SCF/bbl (53 m$^3$/m$^3$) of nitrogen. The gas oil contained 2,000 ppm sulfur as CS$_2$. Analyses of gaseous product streams showed that 99.5 weight percent of the sulfur in the CS$_2$ remained on the catalyst. The sulfur content of the liquid product was analyzed after six hours of operation and found to be equal to the sulfur content of the liquid feed before the CS$_2$ was added. This shows that when CS$_2$ is present, it is preferentially desulfurized. Thus, the amount of sulfur reacted over the catalyst was equal to 3.2 weight percent of the catalyst. This is equal to 33.1 percent of the amount of sulfur required to convert the metals to NiS$_2$, CoS$_2$ and MoS$_3$, or 53.2% of the amount of sulfur required to convert the metals to Ni$_3$S$_2$, Co$_9$S$_8$ and MoS$_2$.

In conducting Runs 1, 2, and 3, as previously noted, the reactor temperature was adjusted to meet the predetermined degree of 68 percent desulfurization. A hydrodesulfurization pressure of 2,143 lbs/in$^2$ (150 kg/cm$^2$), a space velocity of 0.5, and a hydrogen flow rate (92 volume percent hydrogen) of 4,600 SCF/bbl (820 m$^3$/m$^3$) was maintained in each of the runs. A comparison of the results obtained in the aging runs for the catalyst prepared employing a conventional presulfiding step (Run No. 1) and the results obtained by the $CS_2 - N_2$ presulfiding procedure employed in Run No. 2 illustrates that the activity and stability of the catalyst was significantly and substantially improved by the novel presulfiding process.

Prior to Run No. 3, the catalyst, identical to the catalyst employed in Runs 1 and 2, was presulfided employing the method utilized in Run No. 2 with the exception that the gas consisted of 95 percent by volume of hydrogen and 5 percent by volume of methane. FIG. 1 demonstrates that the activity and stability of the catalyst was significantly and substantially improved when compared with the catalyst of Run No. 1 prepared by the conventional presulfiding process.

Figure 2:
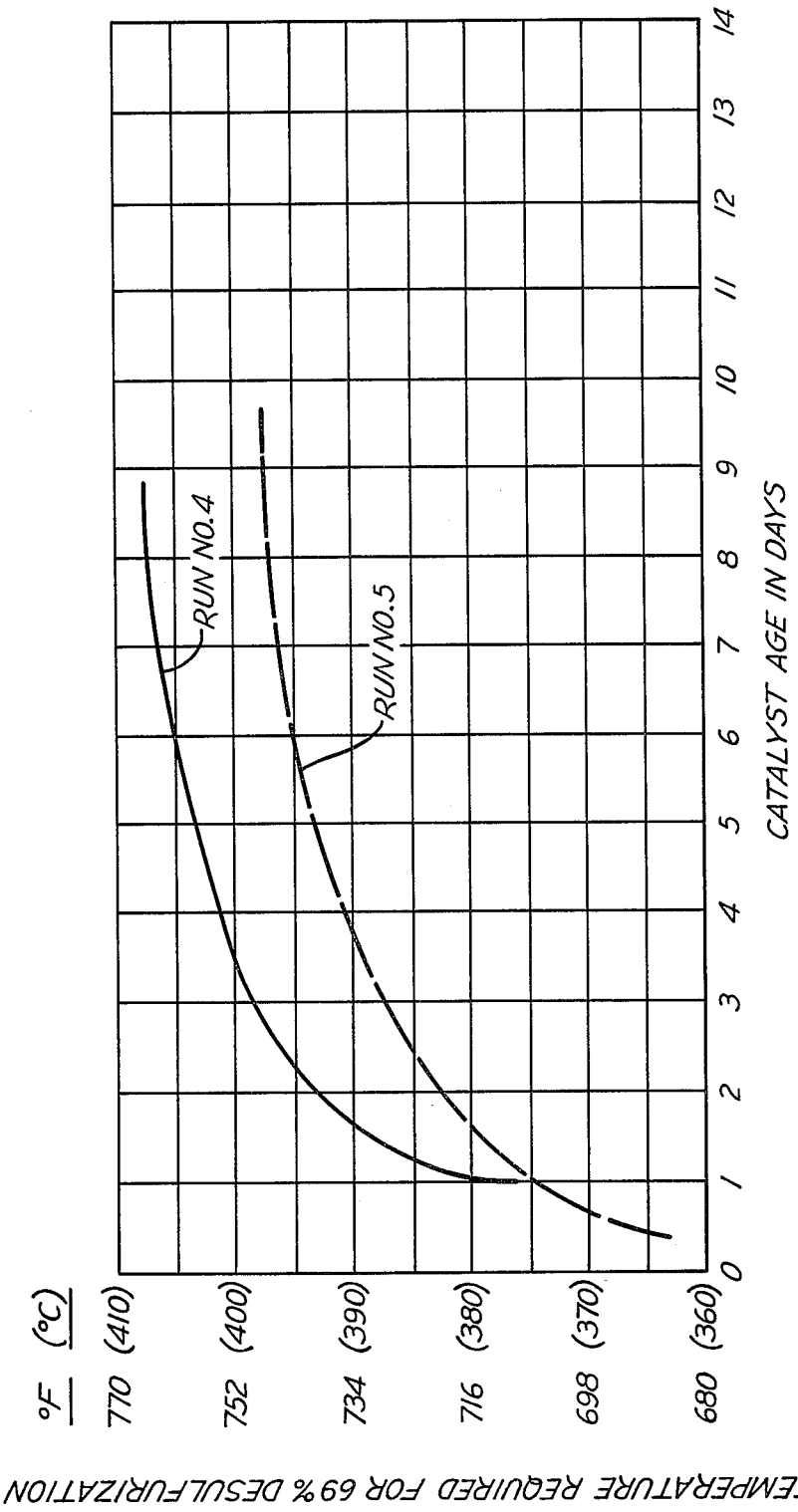

In FIG. 2 there is illustrated the effect of employing the novel presulfiding procedure for a hydrodesulfurization catalyst comprising nickel, titanium, and molybdenum on alumina (Run No. 5). In preparation for Run No. 4 the catalyst comprising 8.0 weight percent molybdenum, 5.0 weight percent titanium, and 3.0 weight percent nickel on alumina was presulfided for 12 hours by treating a West Texas vacuum gas oil containing 2.0 weight percent sulfur at 649° F. (343° C.), 1,993 lbs/in² (139.5 kg/cm²) pressure, and 1.5 LHSV while charging 2,720 SCF/bbl (484.5 m³/m³) of gas containing 92 volume percent hydrogen and 8 volume percent methane. The amount of sulfur removed from the charge stock during presulfiding was equivalent to 23 weight percent of the catalyst. The amount of sulfur required to convert the metals on the catalyst to $NiS_2$, $TiS_2$, and $MoS_3$ is 17.99 weight percent based on the weight of the catalyst. The amount of sulfur required to convert the metals to $Ni_3S_2$, TiS and $MoS_2$ is 9.79 weight percent based on the weight of the catalyst.

In preparation for Run No. 5, the catalyst of Run No. 4 was presulfided for 12 hours by treating with the same West Texas gas oil employed in preparation of the catalyst for Run No. 4. The presulfiding conditions were: 399° F. (204° C.), 214.3 lbs/in² (15.0 kg/cm²) pressure and 1.0 LHSV while charging 600 SCF/bbl (107 m³/m³) of nitrogen. The gas oil contained 2,000 ppm sulfur as $CS_2$. The amount of sulfur removed from the $CS_2$ and reacted over the catalyst was equivalent to 2.2 weight percent of the catalyst. This is equal to 12.0 percent of the amount of sulfur necessary to convert the metals to $NiS_2$, $TiS_2$ and $MoS_3$, or 24.3 percent of the sulfur needed to convert the metals to $Ni_3S_2$, TiS and $MoS_2$.

In hydrodesulfurization Runs 4 and 5 employing the reduced crude change of Runs 1-3, the reactor temperature was adjusted to meet the predetermined 69 percent desulfurization. A hydrodesulfurization pressure of 1,992.9 lb/in² (139.5 kg/cm²), a space velocity of 1.5 LHSV, and a hydrogen flow rate (92 volume percent hydrogen) of 2,720 SCF/bbl (484.5 m³/m³) was maintained in each of the runs. A comparison of the results obtained in each run illustrates that the activity and the stability of the catalyst was substantially improved by the novel presulfiding process employed in Run No. 5.

It is recognized that the novel presulfiding process may result in a portion of the hydrogenation metals being in the completely sulfided form and the remainder of the hydrogenation metals being in the subsulfided form. However, it has been observed that an effective hydrodesulfurization catalyst can be obtained by contacting the catalyst with the sulfiding treating agent in a substantially oxygen-free atmosphere at a temperature in the range of 200° to 450° F. (93° to 232° C.) and at a pressure in the range of atmospheric to 400 psig (1.05 kg/cm² to 28 kg/cm²) until the total amount of the sulfur in the sulfiding agent brought into contact with the catalyst is in the range of 10 to 55 weight percent of the amount of sulfur stoichiometrically required to completely sulfide the metals on the catalyst although only a portion of hydrogenation metals are in the completely sulfided form.

Although the invention has been described with reference to specific embodiments, references, and details, various modifications and changes will be apparent to one skilled in the art and contemplated to be embraced in this invention.

We claim:

1. A process which comprises contacting a catalyst consisting essentially of Group VI-B and Group VIII hydrogenation components on a refractory oxide support with a sulfiding agent selected from the group consisting of $C_1 - C_{20}$ mercaptans, dimethyl sulfide, carbon disulfide and other organic sulfides containing from 1 to 20 carbon atoms per molecule dispersed in a petroleum oil stock which is a liquid under the hereafter described presulfiding conditions, said contacting being conducted in a nitrogen atmosphere substantially free of oxygen and hydrogen and at a presulfiding temperature in the range of 200° to 450° F. and at a presulfiding pressure in the range of atmospheric to 400 psig, maintaining the contact between said sulfiding agent and said catalyst until the total amount of the sulfur in said sulfiding agent brought into contact with said catalyst is in the range of 10 to 55 weight percent of the amount of sulfur required to completely sulfide the metals on the catalyst at the contact temperature and pressure, and thereafter contacting said catalyst with a sulfur-containing hydrocarbon feed under hydrodesulfurization conditions.

2. The process of claim 1 wherein said contacting is conducted at a sulfur weight hourly space velocity less than 0.12 for a period in the range of 4 to 12 hours.

3. The process of claim 1 wherein said sulfiding agent is carbon disulfide.

4. The process of claim 1 wherein said catalyst also contains a Group IV-B hydrogenation component.

5. The process of claim 1 whein said catalyst comprises nickel, cobalt and molybdenum on alumina.

6. The process of claim 1 wherein said catalyst comprises nickel, molybdenum and titanium on alumina.

* * * * *